(12) United States Patent
Komiyama

(10) Patent No.: US 11,705,574 B2
(45) Date of Patent: Jul. 18, 2023

(54) BATTERY INFORMATION PROCESSING APPARATUS, BATTERY MANUFACTURING SUPPORT APPARATUS, BATTERY ASSEMBLY, BATTERY INFORMATION PROCESSING METHOD, AND METHOD OF MANUFACTURING BATTERY ASSEMBLY

(71) Applicant: TOYOTA JIDOSHA KABUSHIKI KAISHA, Toyota (JP)

(72) Inventor: Keita Komiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/562,603

(22) Filed: Dec. 27, 2021

(65) Prior Publication Data

US 2022/0123348 A1 Apr. 21, 2022

Related U.S. Application Data

(62) Division of application No. 16/217,985, filed on Dec. 12, 2018.

(30) Foreign Application Priority Data

Dec. 14, 2017 (JP) ................. 2017-239408

(51) Int. Cl.
*H01M 10/04* (2006.01)
*H01M 50/20* (2021.01)
*G05B 19/18* (2006.01)
*H01M 10/0525* (2010.01)
(Continued)

(52) U.S. Cl.
CPC ........ *H01M 10/0404* (2013.01); *G05B 19/18* (2013.01); *H01M 10/04* (2013.01); *H01M 10/0525* (2013.01); *H01M 10/425* (2013.01); *H01M 50/204* (2021.01);
(Continued)

(58) Field of Classification Search
CPC ......... H01M 10/0424; H01M 10/0525; H01M 50/20; G05B 19/18
See application file for complete search history.

(56) References Cited

U.S. PATENT DOCUMENTS

2008/0315835 A1 12/2008 Okumura et al.
2012/0015221 A1* 1/2012 Murase ................. B60L 58/16
429/90

FOREIGN PATENT DOCUMENTS

JP 2016-139572 A 8/2016

OTHER PUBLICATIONS

Office Action dated Jan. 27, 2022 in U.S. Appl. No. 16/217,985.
(Continued)

*Primary Examiner* — Ula C Ruddock
*Assistant Examiner* — Frank A Chernow
(74) *Attorney, Agent, or Firm* — Sughrue Mion, PLLC

(57) ABSTRACT

When a temperature Tedge of a cell at an end of a battery pack is higher than a temperature Tcen of a cell in a pack central portion, a management server generates rebuilding information for rebuilding a battery pack such that a cell less likely to deteriorate than a cell arranged in the pack central portion is arranged at a pack end. When temperature Tcen is higher than temperature Tedge, the management server generates rebuilding information such that a cell less likely to deteriorate than a cell arranged at the pack end is arranged in the pack central portion.

1 Claim, 15 Drawing Sheets

(51) Int. Cl.
*H01M 10/42* (2006.01)
*H01M 50/204* (2021.01)

(52) U.S. Cl.
CPC ............ *G05B 2219/35193* (2013.01); *H01M 2010/4271* (2013.01); *H01M 2220/20* (2013.01)

(56) References Cited

OTHER PUBLICATIONS

Office Action dated Sep. 6, 2022 in U.S. Appl. No. 16/217,985.
Notice of Allowance dated Mar. 8, 2023, issued in U.S. Appl. No. 16/217,985.

* cited by examiner

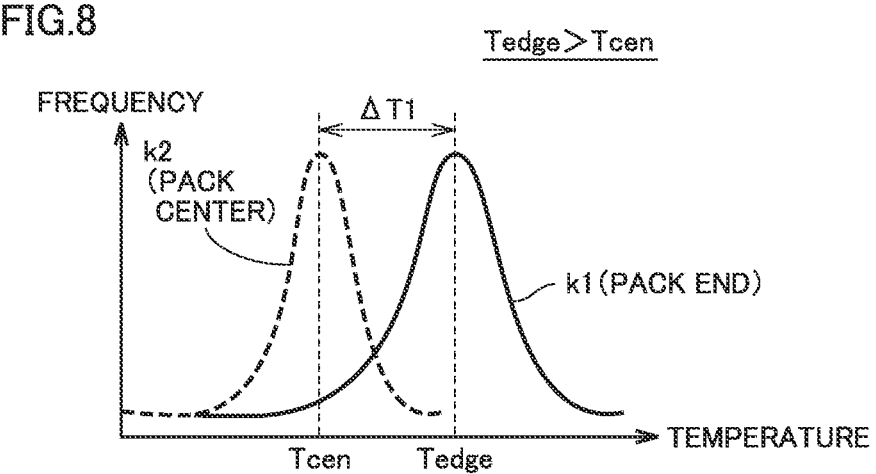
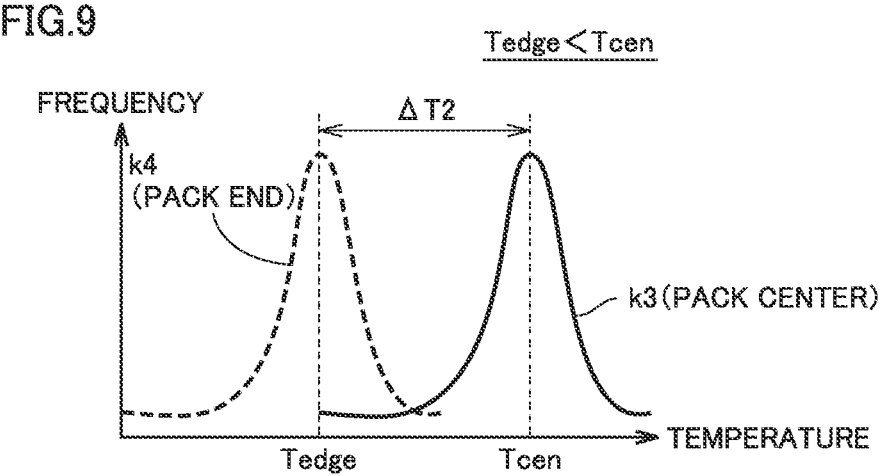

FIG.16
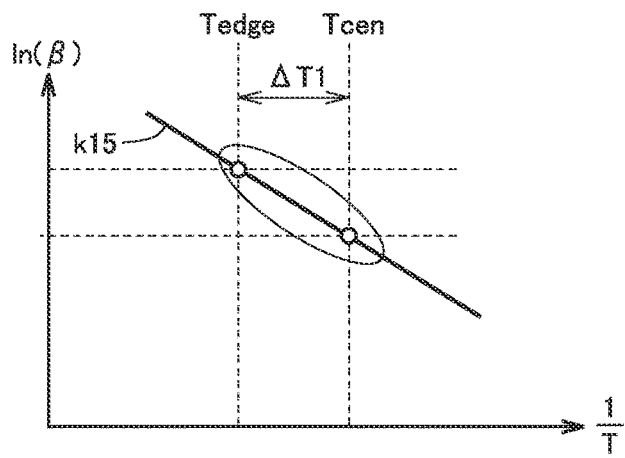
FIG.17
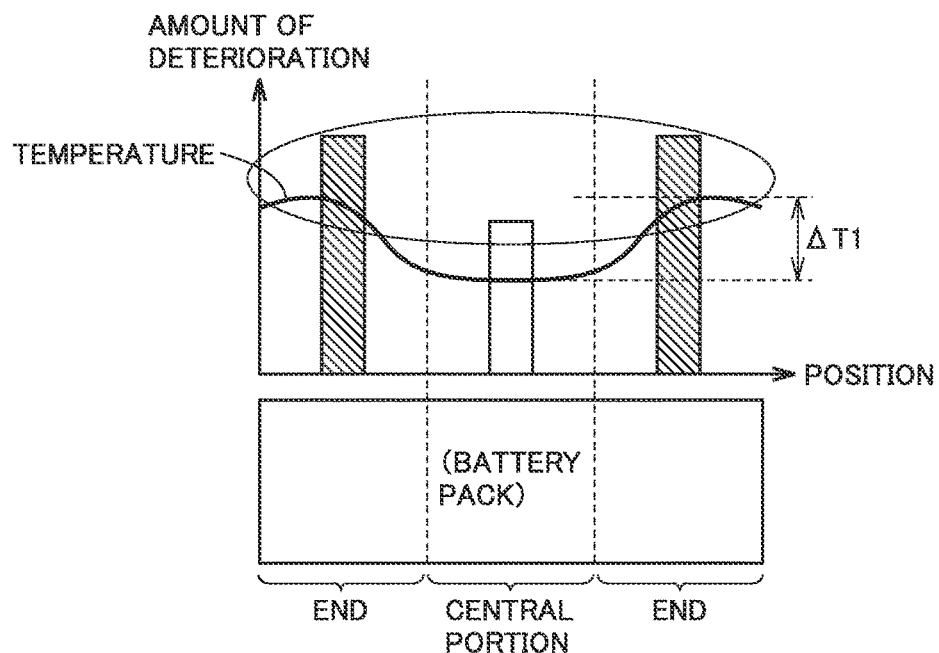
FIG.18
|  |  | EMBODIMENT | COMPARATIVE EXAMPLE |
|---|---|---|---|
| RATE OF INCREASE IN RESISTANCE AFTER RUNNING | CELL AT PACK END | 111.4% | 118.2% |
|  | CELL IN PACK CENTRAL PORTION | 111.3% | 111.4% |

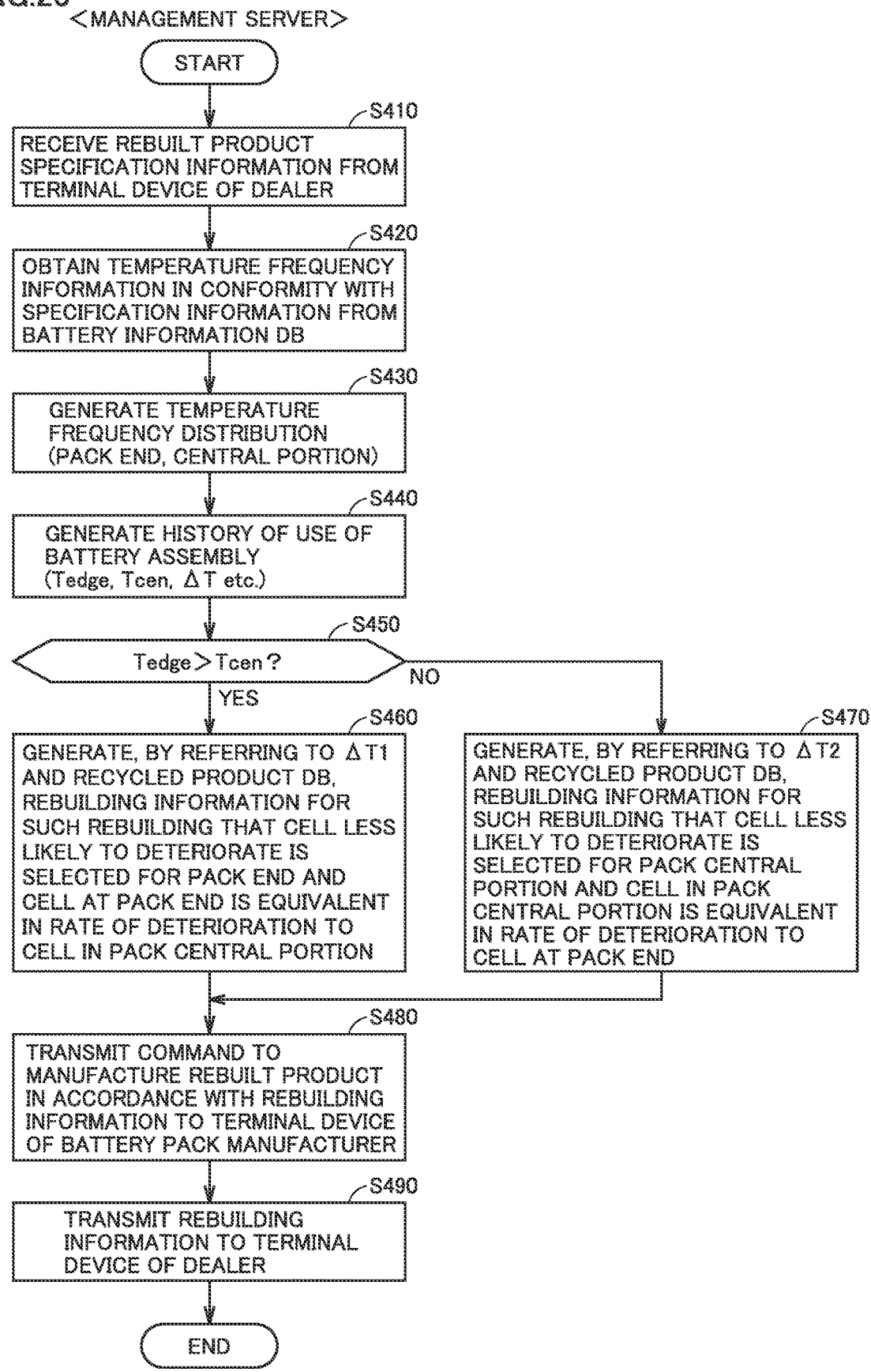

BATTERY INFORMATION PROCESSING APPARATUS, BATTERY MANUFACTURING SUPPORT APPARATUS, BATTERY ASSEMBLY, BATTERY INFORMATION PROCESSING METHOD, AND METHOD OF MANUFACTURING BATTERY ASSEMBLY

This application is a Continuation of U.S. application Ser. No. 16/217,985filed Dec. 12, 2018, which claims priority based on Japanese Patent Application No. 2017-239408 filed with the Japan Patent Office on Dec. 14, 2017, the entire contents of which are hereby incorporated by reference.

BACKGROUND

Field

The present disclosure relates to a battery information processing apparatus, a battery manufacturing support apparatus, a battery assembly, a battery information processing method, and a method of manufacturing a battery assembly, and particularly to a technique for manufacturing a battery assembly including a plurality of cells by replacing at least some of the plurality of cells with replacement cells.

Description of the Background Art

Japanese Patent Laying-Open No. 2016-139572 discloses a battery management system capable of selecting a secondary battery suitable for replacement in replacing a secondary battery mounted on a vehicle. In the battery management system, for a mounted battery, a high-frequency temperature which is a temperature having a highest frequency value is found from a temperature frequency history which shows a frequency of each temperature of a battery pack for each such temperature. For a candidate battery as well, a high-frequency temperature during a period in which the candidate battery has previously been used as a mounted battery is found, and a candidate battery having a high-frequency temperature of which difference from the high-frequency temperature of the mounted battery is within an allowable range is selected as a replacement battery. The candidate battery in which temperature loads comparable to those of the mounted battery have been accumulated can be selected as a replacement battery.

A temperature history of a battery varies depending on usage or an environment of use of the battery. In a battery assembly constituted of a plurality of secondary batteries (each secondary battery being also referred to as a "cell" below), a temperature varies among cells depending on usage or an environment of use even though the cells are accommodated in the same battery pack.

The battery management system described in Japanese Patent Laying-Open No. 2016-139572 selects a replacement cell (a replacement battery) based on a temperature frequency history of a battery pack and it is useful in that an appropriate replacement cell can be selected. The battery management system, however, does not take into account variation in temperature among cells and there is a room for improvement in selectability of a more appropriate replacement cell.

SUMMARY

The present disclosure was made to achieve such an object, and an object of the present disclosure is to provide a battery information processing apparatus and a battery information processing method capable of providing information for selecting an appropriate replacement cell in consideration of variation in temperature among cells.

Another object of the present disclosure is to provide a battery manufacturing support apparatus which allows selection of an appropriate replacement cell in consideration of variation in temperature among cells.

Another object of the present disclosure is to provide a battery assembly manufactured by selecting an appropriate replacement cell in consideration of variation in temperature among cells and a method of manufacturing the same.

A battery information processing apparatus according to the present disclosure is a battery information processing apparatus which processes information for manufacturing a battery assembly including a plurality of cells, and the battery information processing apparatus includes a temperature history obtaining device and a replacement information generator. The temperature history obtaining device is configured to obtain the first temperature history (information on a temperature frequency or a distribution of temperature frequencies at a pack end) and the second temperature history (information on a temperature frequency or a distribution of temperature frequencies in a pack central portion). The first temperature history represents a temperature history of a cell arranged in the vicinity of an outer periphery of the battery assembly. The second temperature history represents a temperature history of a cell arranged in a central portion of the battery assembly. The replacement information generator is configured to generate, by using the first temperature history and the second temperature history, replacement information (rebuilding information) for replacing at least some of the plurality of cells with replacement cells to manufacture the battery assembly. The replacement information generator is configured to (i) generate first replacement information representing the replacement information when the first temperature (Tedge) indicating an index of the first temperature history is higher than the second temperature (Tcen) indicating an index of the second temperature history, and (ii) generate second replacement information representing the replacement information when the second temperature is higher than the first temperature. The first replacement information indicates that the first replacement cell is to be selected and arranged in the vicinity of the outer periphery of the battery assembly. The first replacement cell is determined as being less likely to deteriorate than a cell arranged in a central portion of the battery assembly based on a prescribed indicator indicating less likeliness of deterioration of a cell. The second replacement information indicates that the second replacement cell is to be selected and arranged in the central portion of the battery assembly. The second replacement cell is determined as being less likely to deteriorate than a cell arranged in the vicinity of the outer periphery of the battery assembly based on the indicator.

A battery information processing method according to the present disclosure is a battery information processing method of processing information for manufacturing a battery assembly including a plurality of cells, and the battery information processing method includes (i) obtaining the first temperature history and the second temperature history, the first temperature history representing a temperature history of a cell arranged in the vicinity of an outer periphery of the battery assembly, the second temperature history representing a temperature history of a cell arranged in a central portion of the battery assembly, and (ii) generating, by using the first temperature history and the second temperature history, replacement information for replacing at least some of the plurality of cells with replacement cells to manufacture the battery assembly. The generating replacement information includes (i) determining whether or not a first temperature (Tedge) indicating an index of the first temperature history is higher than a second temperature (Tcen) indicating an index of the second temperature history, (ii) generating first replacement information representing the replacement information when the first temperature is higher than the second temperature, and (iii) generating second replacement information representing the replacement information when the second temperature is higher than the first temperature. The first replacement information indicates that the first replacement cell is to be selected and arranged in the vicinity of the outer periphery of the battery assembly. The first replacement cell is determined as being less likely to deteriorate than a cell arranged in a central portion of the battery assembly based on a prescribed indicator indicating less likeliness of deterioration of a cell. The second replacement information indicates that the second replacement cell is to be selected and arranged in the central portion of the battery assembly. The second replacement cell is determined as being less likely to deteriorate than a cell arranged in the vicinity of the outer periphery of the battery assembly based on the indicator.

According to the configuration, information (replacement information) for manufacturing a battery assembly in which a cell relatively less likely to deteriorate is arranged at a site where a temperature is high and deterioration is likely can be provided to a manufacturer of a battery pack. Since the battery pack manufactured based on the replacement information can be less in variation in deterioration among cells in the battery pack, possibility of occurrence of overcharging due to variation in deterioration can be lessened. According to the battery information processing apparatus and the battery information processing method, information for selecting an appropriate replacement cell in consideration of variation in temperature among cells can thus be provided.

"Obtaining" a temperature history encompasses (i) generating and obtaining a temperature history in the battery information processing apparatus, and (ii) receiving and obtaining a temperature history generated outside the battery information processing apparatus (for example, a vehicle incorporating a battery assembly).

The battery information processing apparatus may be a server which manages battery information or a terminal device different from such a server. When a terminal device is adopted as the battery information processing apparatus, for example, the terminal device may obtain a temperature history obtained by the server from the server so that the terminal device generates replacement information.

The first replacement information may indicate that the first replacement cell is to be selected and arranged in the vicinity of the outer periphery of the battery assembly. The first replacement cell is a cell less likely to deteriorate than a cell arranged in the central portion of the battery assembly as a difference ($\Delta T1$) between the first temperature and the second temperature is greater. The second replacement information may indicate that the second replacement cell is to be selected and arranged in the central portion of the battery assembly. The second replacement cell is a cell less likely to deteriorate than a cell arranged in the vicinity of the outer periphery of the battery assembly as a difference ($\Delta T2$) between the second temperature and the first temperature is greater.

According to such a configuration, depending on a difference between the first temperature and the second temperature, which cell is to be selected can be determined based on to which extent a cell is less likely to deteriorate.

The battery information processing apparatus may further include an information collector configured to collect information on a temperature of the battery assembly and a vehicle incorporating the battery assembly from a plurality of vehicles through a communication network. The temperature history obtaining device may be configured to obtain the first temperature history and the second temperature history by using the information collected from the plurality of vehicles.

According to such a configuration, for example, information for manufacturing a battery assembly in accordance with an area of use by a user (a warm area/a cold area) can be provided by using big data collected from a plurality of vehicles.

A battery manufacturing support apparatus according to the present disclosure is a battery manufacturing support apparatus for manufacturing a battery assembly by replacing at least some of a plurality of cells constituting the battery assembly with replacement cells, and the battery manufacturing support apparatus includes an obtaining device and a selector. The obtaining device is configured to obtain replacement information generated by any battery information processing apparatus described above. The selector is configured to select the replacement cells in accordance with the replacement information obtained by the obtaining device.

According to the battery manufacturing support apparatus, an appropriate replacement cell can be selected in consideration of variation in temperature among cells and a battery assembly can be manufactured with the selected replacement cell.

A battery assembly according to the present disclosure is manufactured in accordance with the replacement information generated by any battery information processing apparatus described above.

According to the battery assembly, variation in deterioration among cells can be lessened. Consequently, possibility of occurrence of overcharging due to variation in deterioration can be lessened.

A method of manufacturing a battery assembly according to the present disclosure is a method of manufacturing a battery assembly including a plurality of cells, and the method includes (i) obtaining replacement information for manufacturing the battery assembly by replacing at least some of the plurality of cells with replacement cells, and (ii) manufacturing the battery assembly by using replacement cells selected in accordance with the obtained replacement information. The replacement information is information generated by using the first temperature history and the second temperature history. The first temperature history represents a temperature history of a cell arranged in the vicinity of an outer periphery of the battery assembly. The second temperature history represents a temperature history of a cell arranged in a central portion of the battery assembly. The replacement information indicates that the first replacement cell is to be selected and arranged in the vicinity of the outer periphery of the battery assembly when a first temperature indicating an index of the first temperature history is higher than a second temperature indicating an index of the second temperature history. The first replacement cell is determined as being less likely to deteriorate than a cell arranged in the central portion of the battery assembly based on a prescribed indicator indicating less likeliness of deterioration of a cell. The replacement information indicates that the second replacement cell is to be selected and arranged in the central portion of the battery assembly when the second temperature is higher than the first temperature. The second replacement cell is determined as being less likely to deteriorate than a cell arranged in the vicinity of the outer periphery of the battery assembly based on the indicator.

According to the method of manufacturing a battery assembly, a battery assembly in which variation in deterioration among cells has been lessened can be manufactured. According to the battery assembly manufactured by the manufacturing method, possibility of occurrence of overcharging due to variation in deterioration can be lessened.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a diagram showing one example of a temperature frequency distribution generated in step S130 in FIG. 7 and a history of use of a battery assembly generated in step S140 in FIG. 7 (Tedge>Tcen).

FIG. 9 is a diagram showing one example of a temperature frequency distribution generated in step S130 in FIG. 7 and a history of use of a battery assembly generated in step S140 in FIG. 7 (Tedge<Tcen).

FIG. 16 is a diagram illustrating a method of selecting a cell for a rebuilt product without taking into consideration variation in temperature among cells in a comparative example.

FIG. 17 is a diagram showing an amount of deterioration and a temperature of cells at an end and in a central portion of a battery pack rebuilt without taking into consideration variation in temperature among cells in the comparative example.

FIG. 18 is a diagram showing one example of a result of evaluation of variation in deterioration between a cell at the pack end and a cell in the pack central portion in a rebuilt product manufactured in a first embodiment and a rebuilt product in the comparative example.

FIG. 23 is a flowchart illustrating a procedure in processing for generating rebuilding information performed by the management server.

DESCRIPTION OF THE PREFERRED EMBODIMENTS

Figure 1:
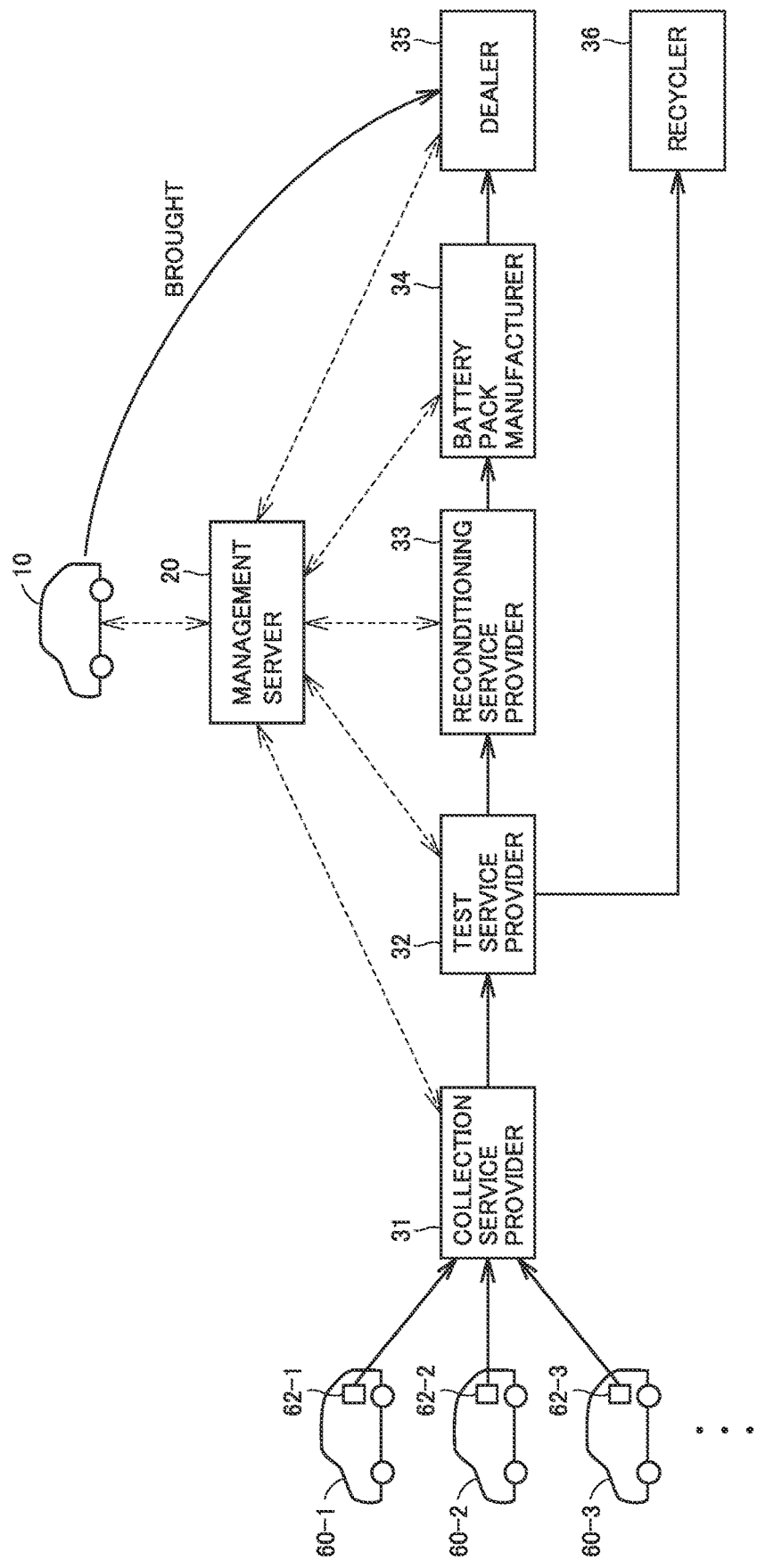
FIG. 1 is a diagram showing one manner of distribution from collection to manufacturing and sales of battery packs in the present disclosure.

An embodiment of the present disclosure will be described below in detail with reference to the drawings. The same or corresponding elements in the drawings have the same reference characters allotted and description thereof will not be repeated.

First Embodiment

FIG. 1 is a diagram showing one manner of distribution from collection to manufacturing and sales of battery packs in the present disclosure. A manner of distribution shown in FIG. 1 is referred to as a "battery distribution model" below. In the battery distribution model, used battery packs are collected from a plurality of vehicles each incorporating battery packs, and battery packs are manufactured by using recyclable cells included in the collected battery packs and then sold.

"Manufacturing of a battery pack" in the present disclosure means manufacturing of a battery pack by replacing at least some of a plurality of cells included in a battery pack with replacement cells. Though the replacement cell is basically a recyclable cell taken out of a collected battery pack, it may be a new cell.

Referring to FIG. 1, a collection service provider 31 collects used battery packs from vehicles 60-1, 60-2, . . . . Vehicles 60-1, 60-2, . . . include battery packs 62-1, 62-2, . . . , respectively, and each battery pack includes a plurality of cells. Collection service provider 31 disassembles collected battery packs and takes out cells from the battery packs. Each cell or each module which is a set of cells may be taken out of a battery pack.

In the battery distribution model, an ID for identifying each cell is provided and information on each cell is managed by a management server 20. Collection service provider 31 transmits an ID of each cell taken out of a battery pack to management server 20 by using a terminal device (not shown).

A test service provider 32 tests performance of each cell collected by collection service provider 31. Specifically, test service provider 32 tests electrical characteristics of a collected cell. For example, test service provider 32 tests electrical characteristics such as a capacity, a resistance value, an open circuit voltage (OCV), and a state of charge (SOC) of a cell. Test service provider 32 makes classification into a recyclable cell and a non-recyclable cell based on a result of the test, passes recyclable cells to a reconditioning service provider 33, and passes non-recyclable cells to a recycler 36. A result of test of each cell is transmitted to management server 20 by using a terminal device (not shown) of test service provider 32.

Reconditioning service provider 33 performs processing for reconditioning a cell determined as being recyclable by test service provider 32 (a replacement cell). By way of example, reconditioning service provider 33 restores a capacity of a cell by discharging the cell to an overdischarged state or charging the cell to an overcharged state. A cell determined as being minor in lowering in performance in the test by test service provider 32 does not have to be subjected to a reconditioning process by reconditioning service provider 33. A result of reconditioning of each cell is transmitted to management server 20 by using a terminal device (not shown) of reconditioning service provider 33.

A battery pack manufacturer 34 manufactures a battery pack by using cells reconditioned by reconditioning service provider 33. In a first embodiment, battery pack manufacturer 34 obtains information for manufacturing a battery pack from management server 20 by using a terminal device (not shown) and manufactures a battery pack in accordance with the obtained information.

Specifically, in the first embodiment, rebuilding information for manufacturing a rebuilt product of a battery pack to be mounted on a vehicle 10 is generated by management server 20 and transmitted to a terminal device of battery pack manufacturer 34. Battery pack manufacturer 34 manufactures a rebuilt product of a battery pack for vehicle 10 by replacing at least some of a plurality of cells included in a battery pack of vehicle 10 with cells (replacement cells) reconditioned by reconditioning service provider 33 in accordance with the rebuilding information.

A dealer 35 sells a battery pack manufactured by battery pack manufacturer 34 for vehicle use or for stationary use in a house or the like. In the first embodiment, vehicle 10 is brought to dealer 35 and dealer 35 replaces battery packs in vehicle 10 with rebuilt products manufactured by battery pack manufacturer 34.

Recycler 36 disassembles cells determined as being non-recyclable by test service provider 32 for reclamation for use as new cells or as source materials for other products.

Figure 2:
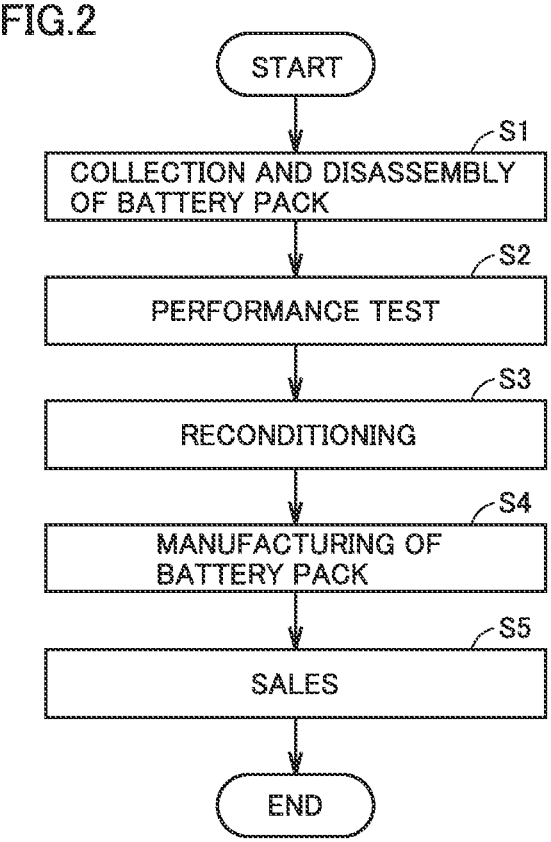
FIG. 2 is a diagram showing a flow of processing in a battery distribution model shown in FIG. 1.

FIG. 2 is a diagram showing a flow of processing in the battery distribution model shown in FIG. 1. Referring FIG. 1 together with FIG. 2, collection service provider 31 collects used battery packs from vehicles 60-1, 60-2, . . . and disassembles them (step S1) and takes out used cells from the battery packs.

Each used cell taken out of the battery pack is passed to test service provider 32 and test service provider 32 tests performance of each used cell (step S2). Specifically, electrical characteristics (a capacity and the like) of each cell are tested as described above. As a result of the performance test, the cells are classified into recyclable cells and non-recyclable cells and the non-recyclable cells are passed to recycler 36.

The cell determined as being recyclable as a result of the performance test is passed to reconditioning service provider 33 and reconditioning service provider 33 performs a process for reconditioning the cell (step S3). For example, a capacity of a cell is restored by discharging the cell to the overdischarged state or charging the cell to the overcharged state.

The reconditioned cell is passed to battery pack manufacturer 34 and battery pack manufacturer 34 manufactures a battery pack by using the reconditioned cell (step S4). In the first embodiment, information (rebuilding information) for manufacturing a battery pack is generated by management server 20 and battery pack manufacturer 34 manufactures a battery pack in accordance with the rebuilding information.

The battery pack manufactured by battery pack manufacturer 34 is passed to dealer 35 and sold for vehicle use or for stationary use in a house or the like (step S5).

Referring again to FIG. 1, vehicle 10 is a vehicle on which a battery pack is mounted (not shown) and for which a battery pack is rebuilt in the battery distribution model (vehicle 10 may be referred to as a "vehicle of interest" below). As described above, in the first embodiment, a battery pack for vehicle 10 is reconstructed by replacing at least some of a plurality of cells included in the battery pack mounted on vehicle 10 with replacement cells.

Though details will be described later, generally, temperature information of a battery assembly in a battery pack mounted on vehicle 10 is transmitted from vehicle 10 to management server 20 and accumulated in management server 20. Management server 20 accumulates information on recyclable cells included in battery packs 62-1, 62-2, . . . collected from vehicles 60-1, 60-2, . . . incorporating battery packs.

When a user of vehicle 10 (vehicle of interest) who desires replacement of a battery pack brings vehicle 10 to dealer 35, information for identifying vehicle 10 is transmitted from a terminal device of dealer 35 to management server 20. Management server 20 obtains accumulated temperature information of a battery assembly of vehicle 10 and generates a history of use of the battery assembly in vehicle 10. Management server 20 generates rebuilding information for constructing a rebuilt product of a battery pack to be mounted on vehicle 10 by referring to the generated history of use of the battery assembly and information on recyclable cells.

The generated rebuilding information is transmitted from management server 20 to a terminal device of battery pack manufacturer 34. Battery pack manufacturer 34 selects a cell based on the rebuilding information from among reconditioned recyclable cells and manufactures a rebuilt product of the battery pack for vehicle 10. The manufactured rebuilt product is delivered to dealer 35 to which vehicle 10 has been brought and the battery pack of vehicle 10 is replaced with the rebuilt product.

Though collection service provider 31, test service provider 32, reconditioning service provider 33, the battery pack manufacturer, and dealer 35 are individual service providers above, classification of the service providers is not limited as such. For example, a single service provider may serve as test service provider 32 and reconditioning service provider 33. Alternatively, collection service provider 31 may be divided into a service provider which collects battery packs and a service provider which disassembles collected battery packs. Locations of each service provider and each dealer are not limited. Locations of each service provider and each dealer may be different or a plurality of service providers or dealers may be located at the same place.

Though each cell is tested and reconditioned above, each module which is a set of some cells may be tested or reconditioned.

Figure 3:
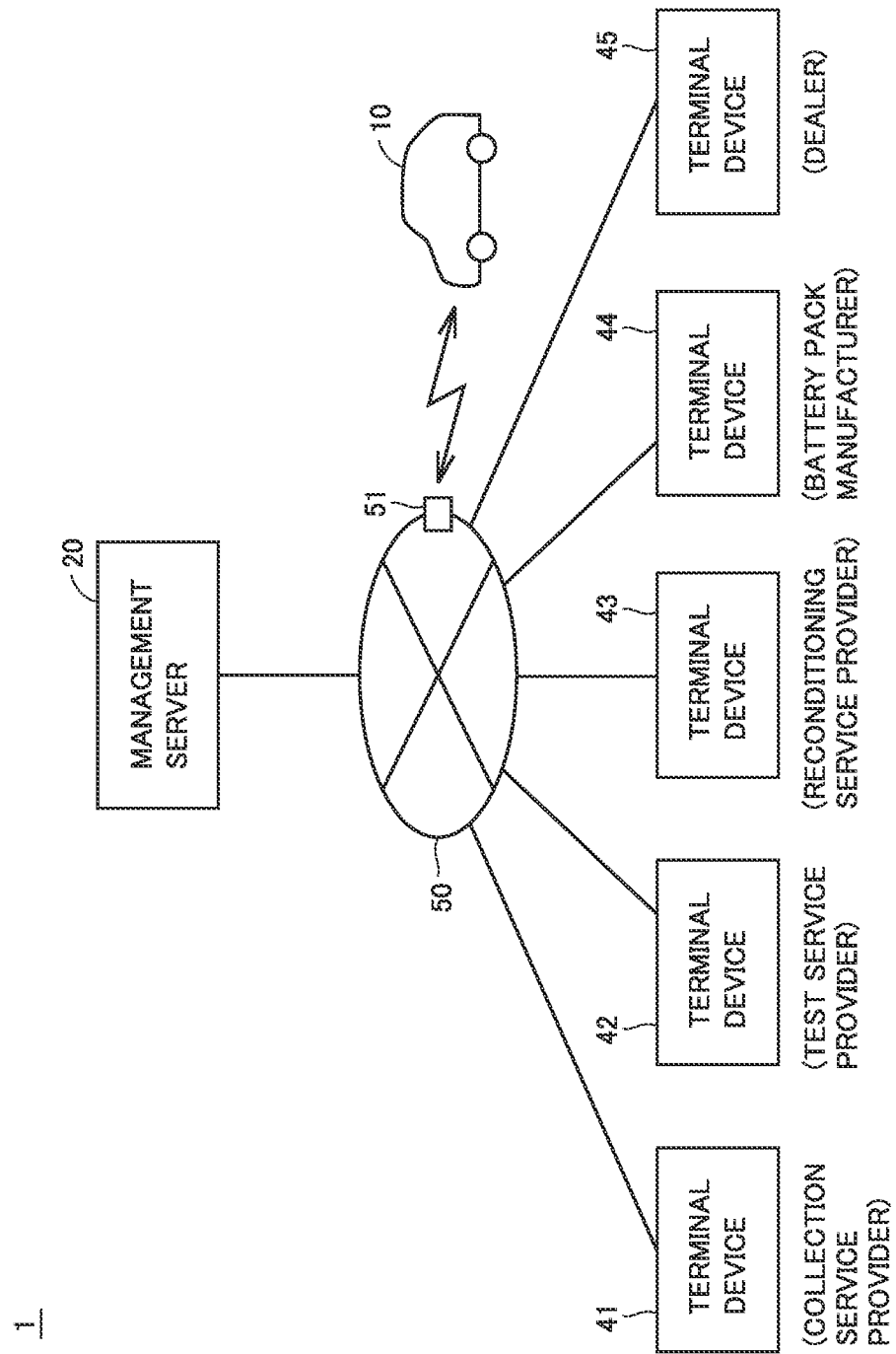
FIG. 3 is a diagram showing an exemplary configuration of a battery management system applied to the battery distribution model shown in FIG. 1.

FIG. 3 is a diagram showing an exemplary configuration of a battery management system applied to the battery distribution model shown in FIG. 1. Referring to FIG. 3, a battery management system 1 includes vehicle 10, management server 20, terminal devices 41 to 45, and a communication network 50.

Vehicle 10, management server 20, and terminal devices 41 to 45 are configured to be able to communicate with one another through communication network 50 such as the Internet or telephone lines. Vehicle 10 is configured to be able to transmit and receive information to and from a base station 51 on communication network 50 through wireless communication.

Terminal device 41 is a terminal device of collection service provider 31 and terminal device 42 is a terminal device of test service provider 32. Terminal device 43 is a terminal device of reconditioning service provider 33 and terminal device 44 is a terminal device of battery pack manufacturer 34. Terminal device 45 is a terminal device of dealer 35.

Figure 4:
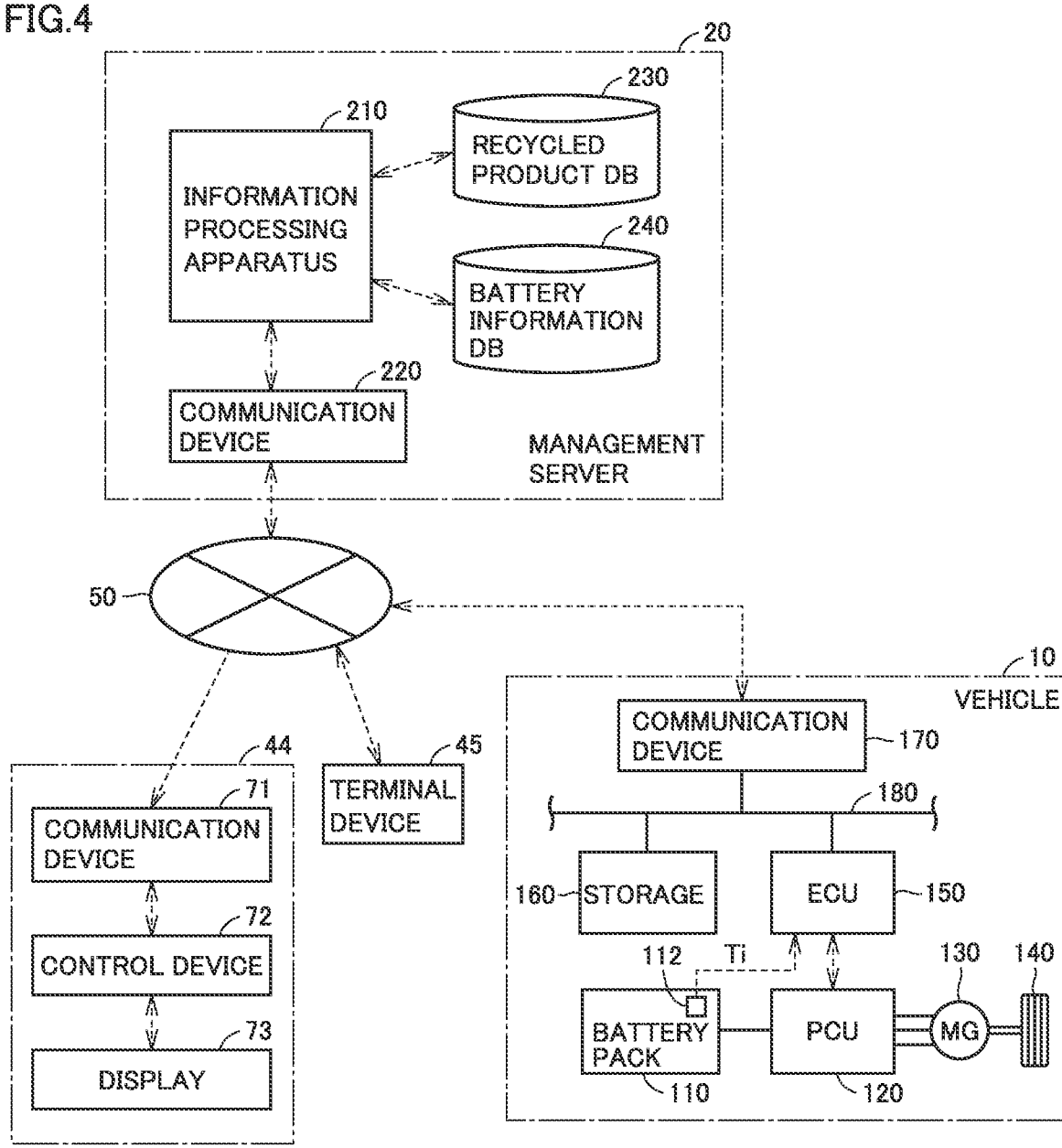
FIG. 4 is a diagram showing in detail a configuration of a vehicle, a management server, and a terminal device of a battery pack manufacturer shown in FIG. 3.

FIG. 4 is a diagram showing in detail a configuration of vehicle 10, management server 20, and terminal device 44 of battery pack manufacturer 34 shown in FIG. 3. Referring to FIG. 4, vehicle 10 includes a battery pack 110, a temperature sensor 112, a power control unit (PCU) 120, a motor generator (MG) 130, a drive wheel 140, an electronic control unit (ECU) 150, a storage 160, and a communication device 170.

Battery pack 110 includes a battery assembly constituted of a plurality of cells and includes, for example, a battery assembly in which a plurality of lithium ion secondary batteries are connected in series and/or in parallel as appropriate. Battery pack 110 supplies electric power for driving drive wheel 140 to PCU 120 by means of MG 130.

Temperature sensor 112 detects a temperature Ti of a battery assembly in battery pack 110 and outputs a temperature value to ECU 150. Temperature sensor 112 detects at least a temperature of a cell (or a module) arranged in the vicinity of an outer periphery of the battery assembly and a temperature of a cell (or a module) arranged in a central portion of the battery assembly.

Figure 5:
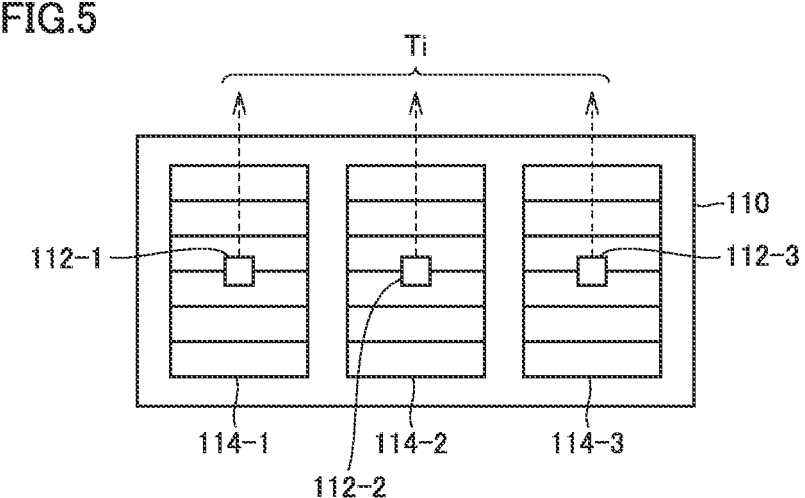
FIG. 5 is a diagram showing one example of a configuration of a battery pack.

FIG. 5 is a diagram showing one example of a configuration of battery pack 110. Referring to FIG. 5, a battery assembly in battery pack 110 is constituted of a plurality of modules 114-1 to 114-3. Module 114-2 is arranged in the central portion of battery pack 110 and modules 114-1 and 114-3 are arranged at ends of battery pack 110.

Temperature sensor 112 is constituted, for example, of a plurality of thermocouples 112-1 to 112-3. Thermocouple 112-1 detects a temperature of a cell included in module 114-1. Thermocouple 112-2 detects a temperature of a cell included in module 114-2. Thermocouple 112-3 detects a temperature of a cell included in module 114-3. Thermocouples 112-1 and 112-3 detect temperatures of cells arranged in the vicinity of the outer periphery of the battery assembly (a pack end) and thermocouple 112-2 detects a temperature of the cell arranged in the central portion of the battery assembly (a pack central portion).

Referring again to FIG. 4, MG 130 is a rotating electric machine and it is implemented, for example, by a three-phase alternating-current (AC) motor generator. MG 130 is driven by PCU 120 and rotates drive wheel 140. MG 130 can also carry out regeneration during braking of vehicle 10. Electric power generated by MG 130 is rectified by PCU 120 and battery pack 110 is charged therewith.

PCU 120 includes an inverter and a converter (neither of which is shown), and drives MG 130 in accordance with a drive signal from ECU 150. PCU 120 converts electric power stored in battery pack 110 into AC power and supplies AC power to MG 130 during driving for power running by MG 130, and rectifies electric power generated by MG 130 and supplies electric power to battery pack 110 during driving for regeneration by MG 130 (during braking of vehicle 10).

ECU 150 includes a central processing unit (CPU), a memory (a read only memory (ROM) and a random access memory (RAM)), and an input and output port for input and output of various signals (none of which is shown). ECU 150 controls PCU 120 and charging and discharging of battery pack 110 such that a desired state of vehicle 10 is achieved. ECU 150 obtains a value of temperature Ti detected by temperature sensor 112, generates temperature frequency information of a battery assembly, and outputs the temperature frequency information to storage 160.

The temperature frequency information of the battery assembly includes first temperature frequency information and second temperature frequency information. The temperature frequency information is information representing a temperature frequency for each temperature, and the temperature frequency represents, for each temperature, a frequency value indicating a frequency of that temperature. The first temperature frequency information is information representing a temperature frequency for each temperature of a cell arranged in the vicinity of the outer periphery of the battery assembly in battery pack 110, and it is generated based on detection values from thermocouples 112-1 and 112-3 (FIG. 5) which detect temperatures of the cells at the pack ends. The second temperature frequency information is information representing a temperature frequency for each temperature of a cell arranged in the central portion of the battery assembly in battery pack 110, and it is generated based on a detection value from thermocouple 112-2 (FIG. 5) which detects a temperature of a cell in the pack central portion.

A temperature history of a battery represented by the temperature frequency information as above generally varies depending on usage or an environment of use of the battery. In battery pack 110 including a battery assembly constituted of a plurality of cells, even though the cells are accommodated in the same battery pack 110, the cells are varied in temperature depending on usage or an environment of use. Variation in temperature among cells leads to variation in deterioration among the cells and to variation in capacity among the cells. Consequently, a cell relatively lower in capacity may be overcharged.

In the first embodiment, a rebuilt product of battery pack 110 is manufactured in consideration of variation in temperature between a cell arranged in the vicinity of the outer periphery of the battery assembly (the pack end) and a cell arranged in the central portion of the battery assembly (the pack central portion) between which a temperature difference is most noticeably exhibited.

Generally, temperature frequency information of battery pack 110 mounted on vehicle 10 (first temperature frequency information of cells at the pack ends and second temperature frequency information of a cell in the pack central portion) is obtained, and a rebuilt product in which a cell relatively less likely to deteriorate is arranged at a site where a temperature is relatively high and deterioration is determined as being more likely (the pack end or the central portion) is manufactured. Since such a rebuilt product can achieve lessened variation in deterioration among cells in a battery pack, possibility of occurrence of overcharging due to variation in deterioration can be lessened.

In the first embodiment, rebuilding information for manufacturing a rebuilt product is generated in management server 20. Therefore, ECU 150 generates temperature frequency information of a battery assembly in battery pack 110, has storage 160 accumulate the temperature frequency information, periodically reads the temperature frequency information from storage 160, and transmits the temperature frequency information to management server 20 through communication device 170.

Management server 20 includes an information processing apparatus 210, a communication device 220, a recycled product database (DB) 230, and a battery information database (DB) 240.

Recycled product DB 230 accumulates information on cells included in secondhand battery packs 62-1, 62-2, . . . (FIG. 1) collected by collection service provider 31 and determined as being recyclable by test service provider 32. This information is collected, for example, by evaluating performance of each cell (evaluating a state of deterioration) in test service provider 32, and includes an indicator indicating a state of deterioration of each cell or less likeliness of deterioration of each cell (a rate of deterioration, a capacity of a cell, a resistance of a cell, a thickness of a negative electrode, and a weight per unit area, details of which will be described later).

Battery information DB 240 accumulates temperature frequency information of a battery assembly in battery pack 110 (first temperature frequency information of cells at the pack ends and second temperature frequency information of a cell in the pack central portion) periodically received from vehicle 10 in association with an ID for identifying vehicle 10.

Information processing apparatus 210 includes a CPU, a memory, and an input and output buffer (none of which is shown). When information processing apparatus 210 receives information for identifying vehicle 10 of which battery pack 110 is to be replaced from terminal device 45 of dealer 35 through communication device 220, it generates rebuilding information for rebuilding battery pack 110 by using data on vehicle 10 stored in battery information DB 240 and data on recyclable cells stored in recycled product DB 230. Details of specific processing for generating rebuilding information will be described later. Information processing apparatus 210 transmits the generated rebuilding information to terminal device 44 of battery pack manufacturer 34 through communication device 220.

Terminal device 44 of battery pack manufacturer 34 includes a communication device 71, a control device 72, and a display 73. Communication device 71 obtains rebuilding information generated by management server 20 from management server 20. Control device 72 selects a replacement cell from among cells reconditioned by reconditioning service provider 33 in accordance with the obtained rebuilding information, and has display 73 show information on the selected replacement cell. Battery pack manufacturer 34 manufactures a rebuilt product of battery pack 110 for vehicle 10 based on the information on the replacement cell shown on display 73.

Terminal device 44 corresponds to one embodiment of the "battery manufacturing support apparatus" in the present disclosure. Communication device 71 corresponds to one embodiment of the "obtaining device" in the present disclosure and control device 72 corresponds to one embodiment of the "selector" in the present disclosure.

Figure 6:
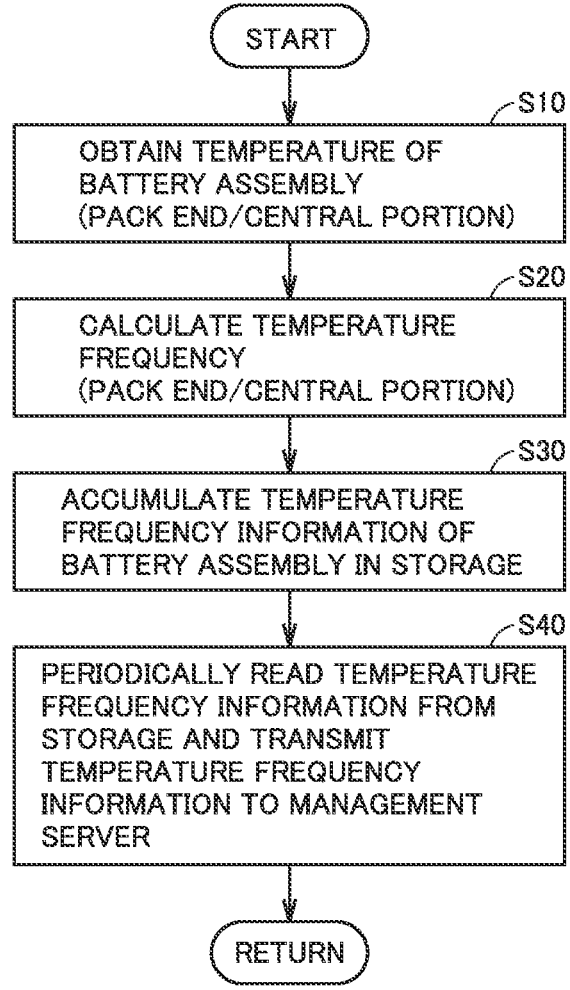
FIG. 6 is a flowchart illustrating a procedure in processing performed by an ECU of a vehicle.

FIG. 6 is a flowchart illustrating a procedure in processing performed by ECU 150 of vehicle 10. Processing shown in this flowchart is repeatedly performed by being called from a main routine every prescribed time or when a prescribed condition is satisfied.

Referring to FIG. 6, ECU 150 obtains a temperature of a battery assembly included in battery pack 110 (step S10). Specifically, as described above, temperature sensor 112 detects a temperature of a cell arranged in the vicinity of the outer periphery of a battery assembly (pack end) and a temperature of a cell arranged in the central portion of the battery assembly (the pack central portion) and ECU 150 obtains a value of each temperature from temperature sensor 112.

Then, ECU 150 calculates a temperature frequency of the obtained temperature of the cell at the pack end and calculates a temperature frequency also of the temperature of the cell in the pack central portion. By way of example, when a state that the temperature of the cell at the pack end is around 30° C. continues for a prescribed period of time, a frequency value of 30° C. of the cell at the pack end is counted up.

ECU 150 generates temperature frequency information resulting from calculation of a temperature frequency in step S20 for each temperature and accumulates the temperature frequency information in storage 160 (step S30). Specifically, ECU 150 generates first temperature frequency information representing a frequency for each temperature of a cell at the pack end and second temperature frequency information representing a frequency for each temperature of a cell in the pack central portion and outputs the temperature frequency information to storage 160.

Then, ECU 150 periodically reads the first and second temperature frequency information accumulated in storage 160 from storage 160 and transmits the temperature frequency information to management server 20 through communication device 170 (step S40). Thus, the first temperature frequency information representing a temperature history of the cell at the pack end and the second temperature frequency information representing a temperature history of the cell in the pack central portion in battery pack 110 mounted on vehicle 10 are generated, and transmitted to and accumulated in management server 20.

Figure 7:
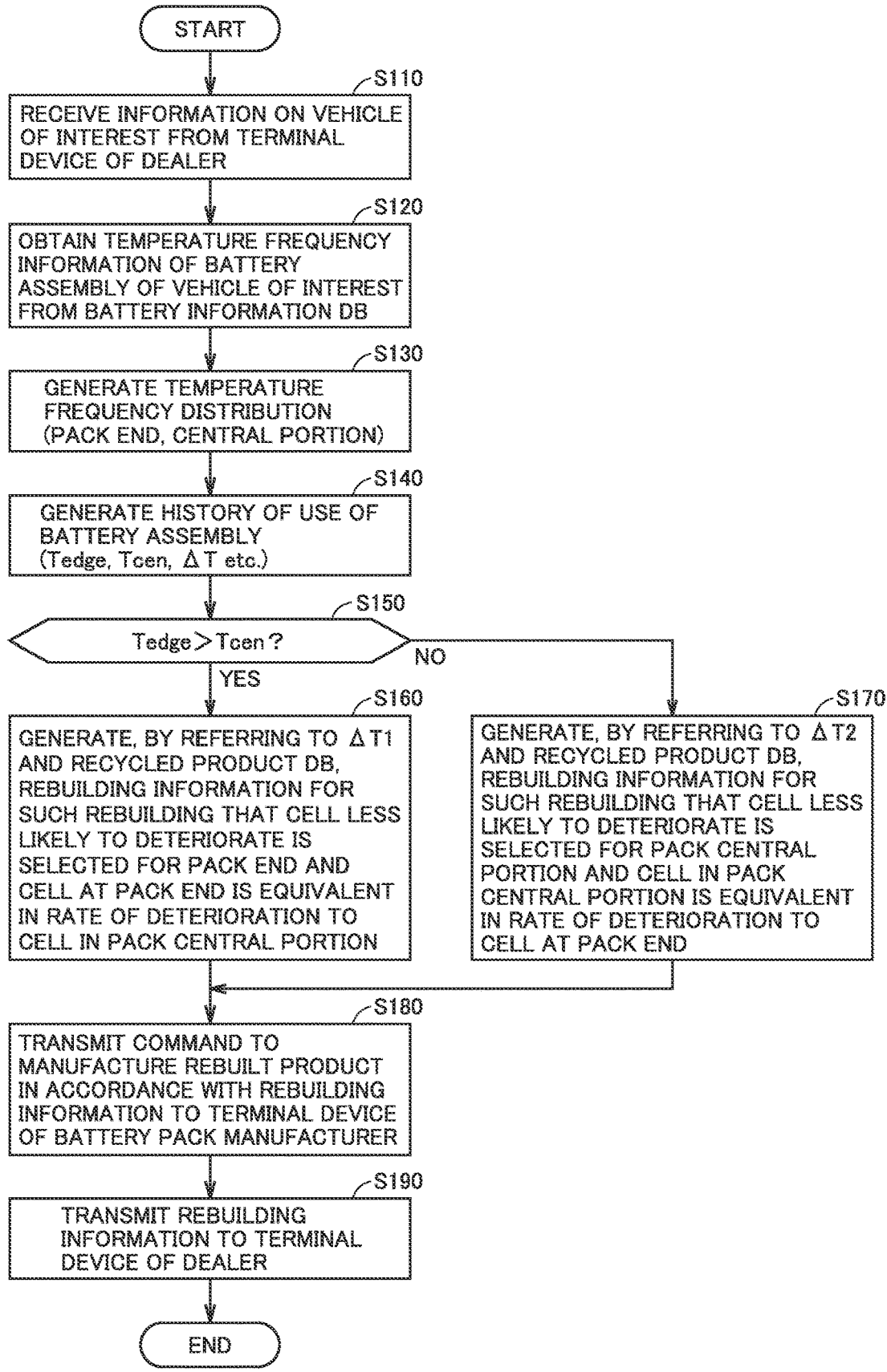
FIG. 7 is a flowchart illustrating a procedure in processing performed by the management server.

FIG. 7 is a flowchart illustrating a procedure in processing performed by management server 20. Processing shown in the flowchart is performed when information for identifying vehicle 10 (vehicle of interest) of which battery pack 110 is to be replaced is received from terminal device 45 of dealer 35.

Referring to FIG. 7, management server 20 (information processing apparatus 210) receives the information on the vehicle of interest (vehicle 10) from terminal device 45 of dealer 35 (step S110). Then, management server 20 obtains temperature frequency information (first and second temperature frequency information) of a battery assembly in the vehicle of interest (vehicle 10) from battery information DB 240 (step S120). Management server 20 obtains the temperature frequency information of the battery assembly in the vehicle of interest (vehicle 10) identified by the information received from terminal device 45 from battery information DB 240.

Then, management server 20 generates a temperature frequency distribution of the battery assembly in vehicle 10 based on the temperature frequency information of the battery assembly in vehicle 10 obtained from battery information DB 240 (step S130). Specifically, management server 20 generates a temperature frequency distribution of the cell at the pack end in battery pack 110 of vehicle 10 based on the first temperature frequency information and generates a temperature frequency distribution of the cell in the pack central portion in battery pack 110 based on the second temperature frequency information. Management server 20 further generates a history of use of the battery assembly of vehicle 10 based on the generated temperature frequency distributions (step S140).

FIGS. 8 and 9 are diagrams showing examples of a temperature frequency distribution generated in step S130 in FIG. 7 and a history of use of a battery assembly generated in step S140 in FIG. 7.

Referring to FIG. 8, a solid line k1 represents a temperature frequency distribution of the cell at the pack end generated based on the first temperature frequency information and a dotted line k2 represents a temperature frequency distribution of the cell in the pack central portion generated based on the second temperature frequency information.

Temperatures Tedge and Tcen and a temperature difference ΔT1 represent a history of use of the battery assembly generated based on the temperature frequency distribution. Temperature Tedge represents a temperature at a frequency peak of solid line k1 representing the temperature frequency distribution of the cell at the pack end and temperature Tcen represents a temperature at a frequency peak of dotted line k2 representing the temperature frequency distribution of the cell in the pack central portion. Temperature difference ΔT1 represents a difference between temperature Tedge and temperature Tcen. FIG. 8 shows an example in which a condition of Tedge>Tcen is satisfied. It is understood that battery pack 110 of vehicle 10 is used in such a manner that a temperature of the cell at the pack end is higher than a temperature of the cell in the pack end. Such usage tends to be observed when load in running (load imposed on the battery) is generally high.

In another example, referring to FIG. 9, a solid line k3 represents a temperature frequency distribution of a cell in the pack central portion generated based on the second temperature frequency information and a dotted line k4 represents a temperature frequency distribution of a cell at the pack end generated based on the first temperature frequency information. A temperature difference ΔT2 represents a difference between temperature Tcen and temperature Tedge. FIG. 9 shows an example in which a condition of Tedge<Tcen is satisfied. It is understood that battery pack 110 of vehicle 10 is used in such a manner that a temperature of the cell in the pack central portion is higher than a temperature of the cell at the pack end. Such usage tends to be observed when load in running (load imposed on the battery) is generally low.

In the first embodiment, when a history of use of the battery pack of the vehicle of interest exhibits the condition of Tedge>Tcen (FIG. 8) in generation of rebuilding information for rebuilding a battery pack for the vehicle of interest by management server 20, management server 20 generates rebuilding information for such rebuilding that a cell less likely to deteriorate than a cell arranged in the pack central portion is arranged at the pack end. When a history of use of the battery pack of the vehicle of interest exhibits the condition of Tedge<Tcen (FIG. 9), management server 20 generates rebuilding information for such rebuilding that a cell less likely to deteriorate than a cell arranged at the pack end is arranged in the pack central portion. Such a rebuilt product can be less in variation in deterioration among cells in a battery pack.

A cell determined as being relatively less likely to deteriorate based on various indicators can be adopted as a cell less likely to deteriorate.

Figure 10:
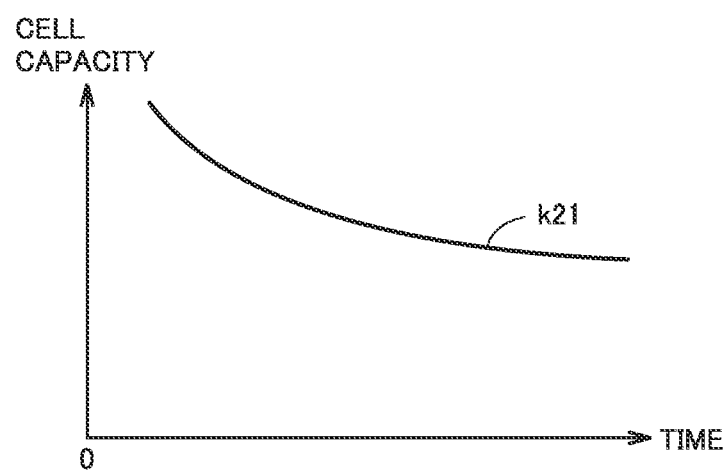
FIG. 10 is a diagram showing variation over time in cell capacity.

FIG. 10 is a diagram showing variation over time in cell capacity. Referring to FIG. 10, a cell capacity lowers (deteriorates) with lapse of time of use. In general, a degree of lowering in cell capacity is lower as lowering in capacity proceeds. For example, out of two cells equal to each other in current cell capacity, a cell of which lowering in capacity has progressed as compared with a new cell can be concluded as a cell relatively less likely to deteriorate than a cell of which lowering in capacity has not progressed.

Figure 11:
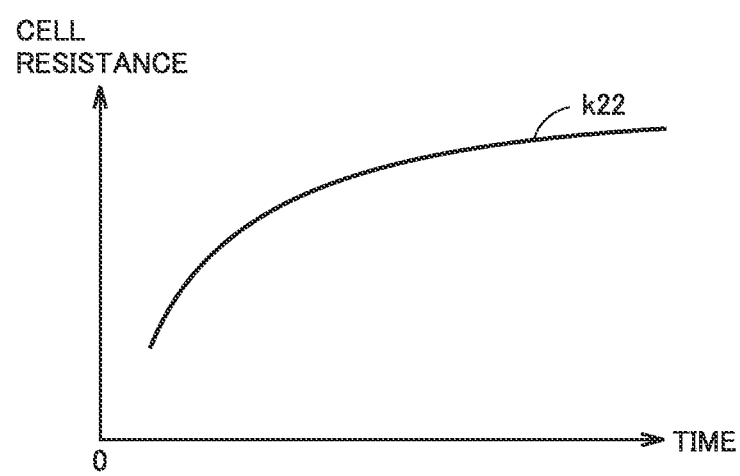
FIG. 11 is a diagram showing variation over time in cell resistance.

FIG. 11 is a diagram showing variation over time in cell resistance. Referring to FIG. 11, a cell resistance increases (deteriorates) with lapse of time of use. In general, a degree of increase in cell resistance is lower as increase in resistance progresses. For example, out of two cells equal to each other in current cell resistance, a cell of which increase in resistance has progressed as compared with a new cell can be concluded as a cell relatively less likely to deteriorate than a cell of which increase in resistance has not progressed.

Alternatively, although not particularly shown, a cell small in thickness of a negative electrode (for example, a cell of which thickness of the negative electrode is close to the lower limit of a tolerance of thickness) or a cell light in weight per unit area (for example, a cell of which weight per unit area is close to the lower limit of a tolerance of weight per unit area) is relatively lower in rate of deterioration than a cell large in thickness of the negative electrode (a cell of which thickness of the negative electrode is close to the upper limit of a tolerance of thickness) or a cell heavy in weight per unit area (a cell of which weight per unit area is close to the upper limit of a tolerance of weight per unit area), and such a cell can also be adopted as a cell relatively less likely to deteriorate. This indicator can be adopted also when a new cell is used for a cell in a rebuilt product.

When a history of use of a battery pack satisfies the condition of Tedge>Tcen (FIG. 8), a cell less likely to deteriorate than a cell arranged in the pack central portion may be arranged at the pack end as temperature difference ΔT1 between temperature Tedge and temperature Tcen is greater. Similarly, when a history of use of a battery pack satisfies the condition of Tedge<Tcen (FIG. 9), a cell less likely to deteriorate than a cell arranged at the pack end may be arranged in the pack central portion as temperature difference ΔT2 between temperature Tcen and temperature Tedge is greater.

In the first embodiment, when the condition of Tedge>Tcen is satisfied (FIG. 8), rebuilding information for such rebuilding that a cell at the pack end is equivalent in rate of deterioration to a cell in the pack central portion is generated with reference to temperature difference ΔT1.

Figure 12:
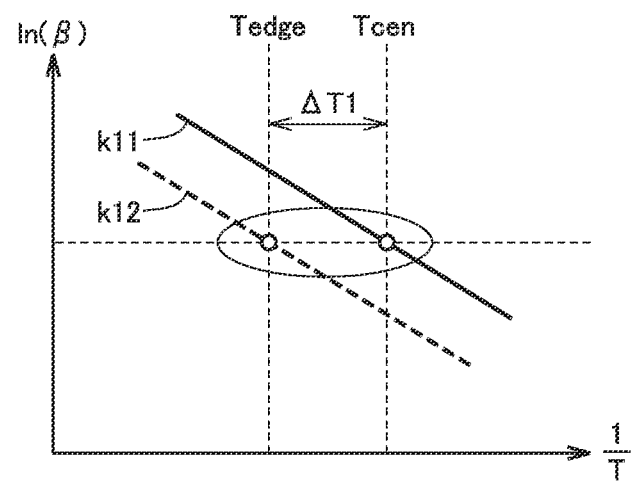
FIG. 12 is a diagram illustrating a method of selecting a cell in a rebuilt product when a condition of Tedge>Tcen is satisfied.

FIG. 12 is a diagram illustrating a method of selecting a cell in a rebuilt product when the condition of Tedge>Tcen is satisfied. Referring to FIG. 12, the abscissa represents a reciprocal of a cell temperature T and the ordinate represents a natural logarithmic value of a rate of deterioration β (for example, a rate of increase in internal resistance). As shown, temperature dependency under the Arrhenius law of rate of deterioration β is understood.

A solid line k11 represents a deterioration curve of a cell in the pack central portion. A dotted line k12 represents a deterioration curve of a cell at the pack end. A rebuilt product in which the pack central portion and the pack end are equivalent in rate of deterioration to each other can be constructed by adopting a cell at the pack end shown with dotted line k12 equivalent in rate of deterioration β to a cell in the pack central portion shown with solid line k11 in accordance with temperature difference ΔT1 between temperature Tedge and temperature Tcen.

When the condition of Tedge<Tcen is satisfied (FIG. 9), rebuilding information for such rebuilding that a cell in the pack central portion is equivalent in rate of deterioration to a cell at the pack end is generated with reference to temperature difference ΔT2.

Figure 13:
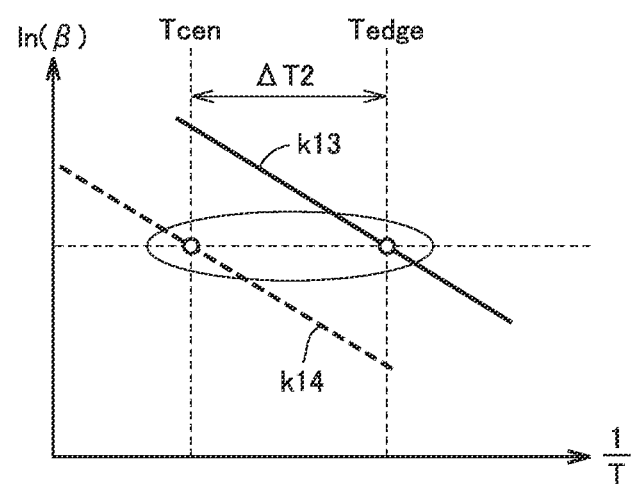
FIG. 13 is a diagram illustrating a method of selecting a cell for a rebuilt product when a condition of Tedge<Tcen is satisfied.

FIG. 13 is a diagram illustrating a method of selecting a cell in a rebuilt product when the condition of Tedge<Tcen is satisfied. Referring to FIG. 13, a solid line k13 represents a deterioration curve of a cell at the pack end. A dotted line k14 represents a deterioration curve of a cell in the pack central portion. A rebuilt product in which the pack central portion and the pack end can be equivalent in rate of deterioration to each other can be constructed by adopting a cell in the pack central portion shown with dotted line k14 equivalent in rate of deterioration β to a cell at the pack end shown with solid line k13 in accordance with temperature difference ΔT2 between temperature Tcen and temperature Tedge.

Referring again to FIG. 7, when a history of use of the battery assembly of vehicle 10 is generated in step S140, management server 20 determines whether or not temperature Tedge representing a history of use of a cell at the pack end is higher than temperature Tcen representing a history of use of a cell in the pack central portion (step S150).

When temperature Tedge is determined as being higher than temperature Tcen (YES in step S150), management server 20 generates rebuilding information for such rebuilding that a cell less likely to deteriorate is selected for the pack end and a cell at the pack end is equivalent in rate of deterioration to a cell in the pack central portion as described above by referring to temperature difference ΔT1 and recycled product DB 230 which stores information on recyclable cells (step S160).

When it is determined in step S150 that temperature Tedge is lower than temperature Tcen (NO in step S150), management server 20 generates rebuilding information for such rebuilding that a cell less likely to deteriorate is selected for the pack central portion and a cell in the pack central portion is equivalent in rate of deterioration to a cell at the pack end as described above by referring to temperature difference ΔT2 and recycled product DB 230 (step S170).

When the rebuilding information is generated in step S160 or S170, management server 20 transmits a command to manufacture a rebuilt product in accordance with the generated rebuilding information to terminal device 44 of battery pack manufacturer 34 (step S180). Thus, battery pack manufacturer 34 manufactures a rebuilt product of battery pack 110 to be mounted on vehicle 10. The rebuilt product in accordance with such rebuilding information is less in variation in deterioration among cells in usage of battery pack 110 in vehicle 10. Management server 20 transmits the generated rebuilding information further to terminal device 45 of dealer 35 to which vehicle 10 has been brought (step S190).

Figure 14:
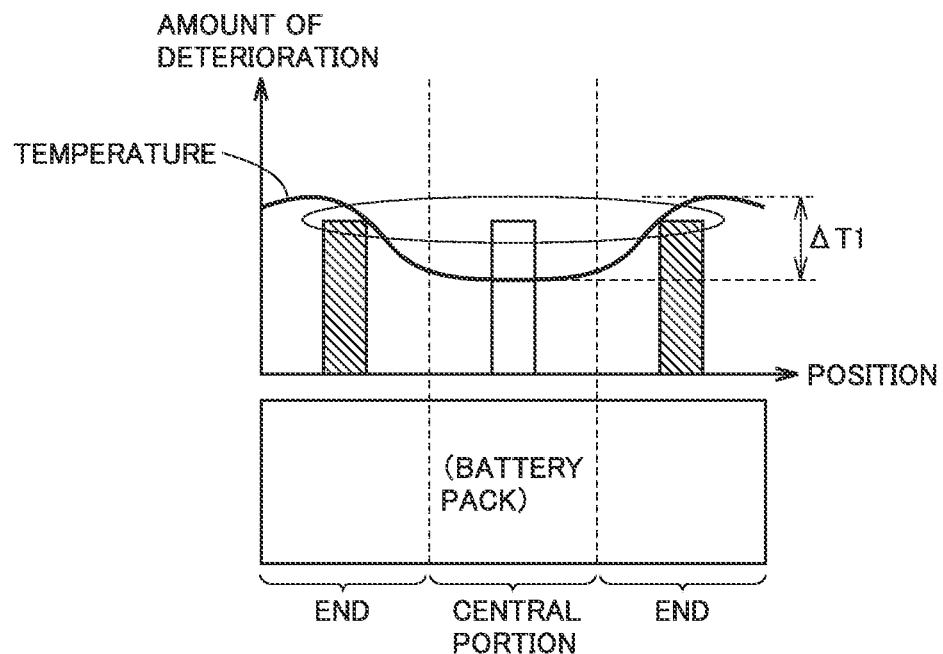
FIG. 14 is a diagram showing an amount of deterioration and a temperature of cells at a pack end and in a central portion of a rebuilt product (Tedge>Tcen).
Figure 15:
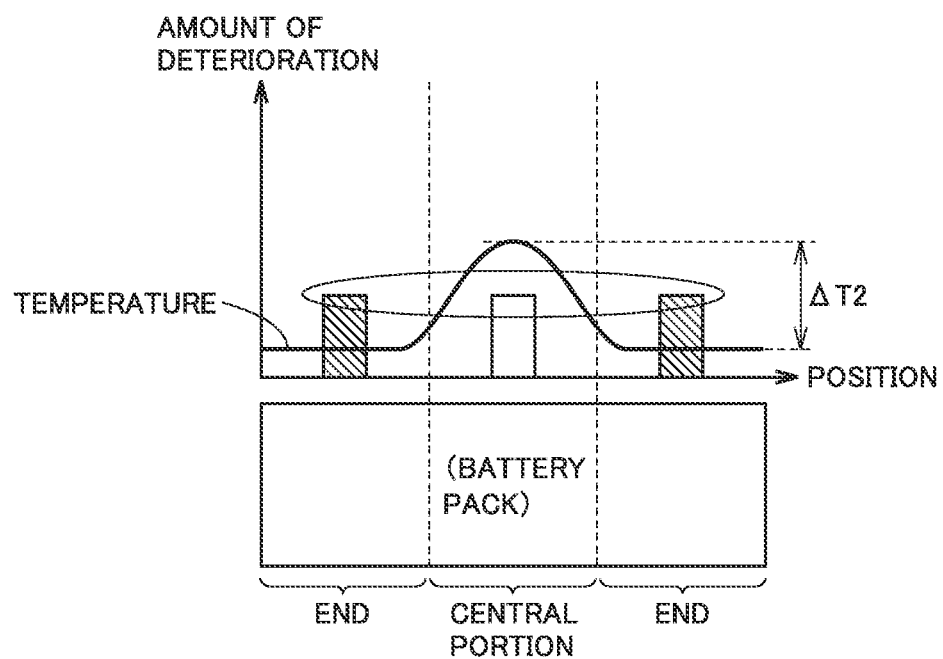
FIG. 15 is a diagram showing an amount of deterioration and a temperature of cells at the pack end and in the central portion of a rebuilt product (Tedge<Tcen).

FIGS. 14 and 15 are diagrams each showing an amount of deterioration and a temperature of cells at the end and the central portion of rebuilt battery pack 110. FIG. 14 shows an example in which a history of use of battery pack 110 satisfies the condition of Tedge>Tcen and FIG. 15 shows an example in which a history of use of battery pack 110 satisfies the condition of Tedge<Tcen.

Referring to FIG. 14, in this example, a temperature of the cell at the pack end is higher than a temperature of the cell in the pack central portion and the cells are varied in temperature by temperature difference ΔT1. A rebuilt product is constructed by selecting a cell less likely to deteriorate for the pack end such that the cell at the pack end is equivalent in rate of deterioration to the cell in the pack central portion in accordance with temperature difference ΔT1. The cell at the pack end and the cell in the pack central portion are thus equivalent in amount of deterioration to each other in such usage that temperature difference ΔT1 between the pack end and the central portion is produced.

Referring to FIG. 15, in this example, a temperature of the cell in the pack central portion is higher than a temperature of the cell at the pack end and the cells are varied in temperature by temperature difference ΔT2. A rebuilt product is constructed by selecting a cell less likely to deteriorate for the pack central portion such that the cell in the pack central portion is equivalent in rate of deterioration to the cell at the pack end in accordance with temperature difference ΔT2. The cell at the pack end and the cell in the pack central portion are thus equivalent in amount of deterioration to each other in such usage that temperature difference ΔT2 between the pack end and the central portion is produced.

According to the present first embodiment, since variation in deterioration between a cell at the pack end and a cell in the central portion can thus be lessened in rebuilt battery pack 110, possibility of occurrence of overcharging due to variation in deterioration can be lessened.

FIG. 16 is a diagram illustrating a method of selecting a cell in a rebuilt product without taking into consideration variation in temperature among cells in a comparative example. FIG. 17 is a diagram showing an amount of deterioration and a temperature of cells at the end and the central portion of a battery pack rebuilt without taking into consideration variation in temperature among cells in the comparative example.

Referring to FIG. 16, though a history of use of a battery pack satisfies the condition of Tedge>Tcen in the comparative example, a cell less likely to deteriorate (a line k15) equally to a cell in the pack central portion is adopted for the pack end without taking into consideration such variation in temperature (ΔT1). Then, as shown, the cell at the pack end relatively high in temperature is higher in rate of deterioration than the cell in the pack central portion.

Consequently, referring to FIG. 17, in a rebuilt product according to the comparative example, the cell at the pack end relatively high in temperature is greater in amount of deterioration than the cell in the pack central portion. In the rebuilt product according to the comparative example without taking into consideration variation in temperature among cells, the cells are varied in deterioration.

FIG. 18 is a diagram showing one example of a result of evaluation of variation in deterioration between a cell at the pack end and a cell in the pack central portion in a rebuilt product manufactured in the present first embodiment and a rebuilt product according to the comparative example. In this example, a rate of increase in resistance after running was checked in a cell at the pack end and a cell in the pack central portion as evaluation of variation in deterioration.

Referring to FIG. 18, the rebuilt product according to the comparative example was varied in rate of increase in resistance (variation in deterioration) between the cell at the pack end (118.2%) and the cell in the pack central portion (111.4%).

In the rebuilt product (Example) manufactured in the present first embodiment, variation in rate of increase in resistance (variation in deterioration) between the cell at the pack end (111.4%) and the cell in the pack central portion (111.3%) was suppressed.

As set forth above, according to the first embodiment, a rebuilt product in which a cell relatively less likely to deteriorate is arranged at a site where a temperature is high and deterioration is likely can be manufactured. Since such a rebuilt product can be less in variation in deterioration among cells in a battery pack, possibility of occurrence of overcharging due to variation in deterioration can be lessened. According to the first embodiment, an appropriate replacement cell can thus be selected in consideration of variation in temperature among cells.

In the first embodiment, when a history of use of the battery pack satisfies the condition of Tedge>Tcen, a cell less likely to deteriorate than a cell arranged in the pack central portion is arranged at the pack end as temperature difference $\Delta T1$ is greater. When the condition of Tedge<Tcen is satisfied, a cell less likely to deteriorate than a cell arranged at the pack end is arranged in the pack central portion as temperature difference $\Delta T2$ is greater. Therefore, according to the first embodiment, depending on a difference between temperature Tedge and temperature Tcen, which cell should be selected can be determined based on to which extent a cell is less likely to deteriorate.

Though information on a temperature of battery pack 110 of vehicle 10 is collected by management server 20 and management server 20 generates a temperature frequency distribution of a battery assembly and generates a history of use of the battery assembly based on the generated temperature frequency distribution in the example above, vehicle 10 may generate a temperature frequency distribution of a battery assembly and management server 20 may obtain the temperature frequency distribution of the battery assembly from vehicle 10 and generate a history of use of the battery assembly. Alternatively, vehicle 10 may generate up to a history of use of a battery assembly and management server 20 may obtain the history of use of the battery assembly from vehicle 10.

Though management server 20 collects information on a temperature of battery pack 110 of vehicle 10 and generates rebuilding information for rebuilding battery pack 110 in the example above, for example, information on a temperature of battery pack 110 may be accumulated in vehicle 10 without using management server 20 and terminal devices 44 and 45 of battery pack manufacturer 34 and dealer 35 may generate rebuilding information.

Alternatively, information on a temperature of battery pack 110 of vehicle 10 may be accumulated in vehicle 10, and when vehicle 10 is brought to dealer 35, vehicle 10 may be connected to terminal device 45 of dealer 35 to transmit the information on the temperature of battery pack 110 from terminal device 45 to management server 20.

Though vehicle 10 calculates a temperature frequency of a battery assembly and generates temperature frequency information in the example above, vehicle 10 may merely detect a temperature of a battery assembly and transmit the detected temperature to management server 20, and management server 20 may calculate a temperature frequency and generate temperature frequency information.

Second Embodiment

In the first embodiment, information on a battery pack mounted on a vehicle of interest (vehicle 10) is collected and a battery pack for a vehicle of interest (vehicle 10) is rebuilt based on the collected information.

In a second embodiment, information on battery packs is collected by the management server from a plurality of vehicles each incorporating battery packs, and battery packs are rebuilt based on the collected information (big data).

Figure 19:
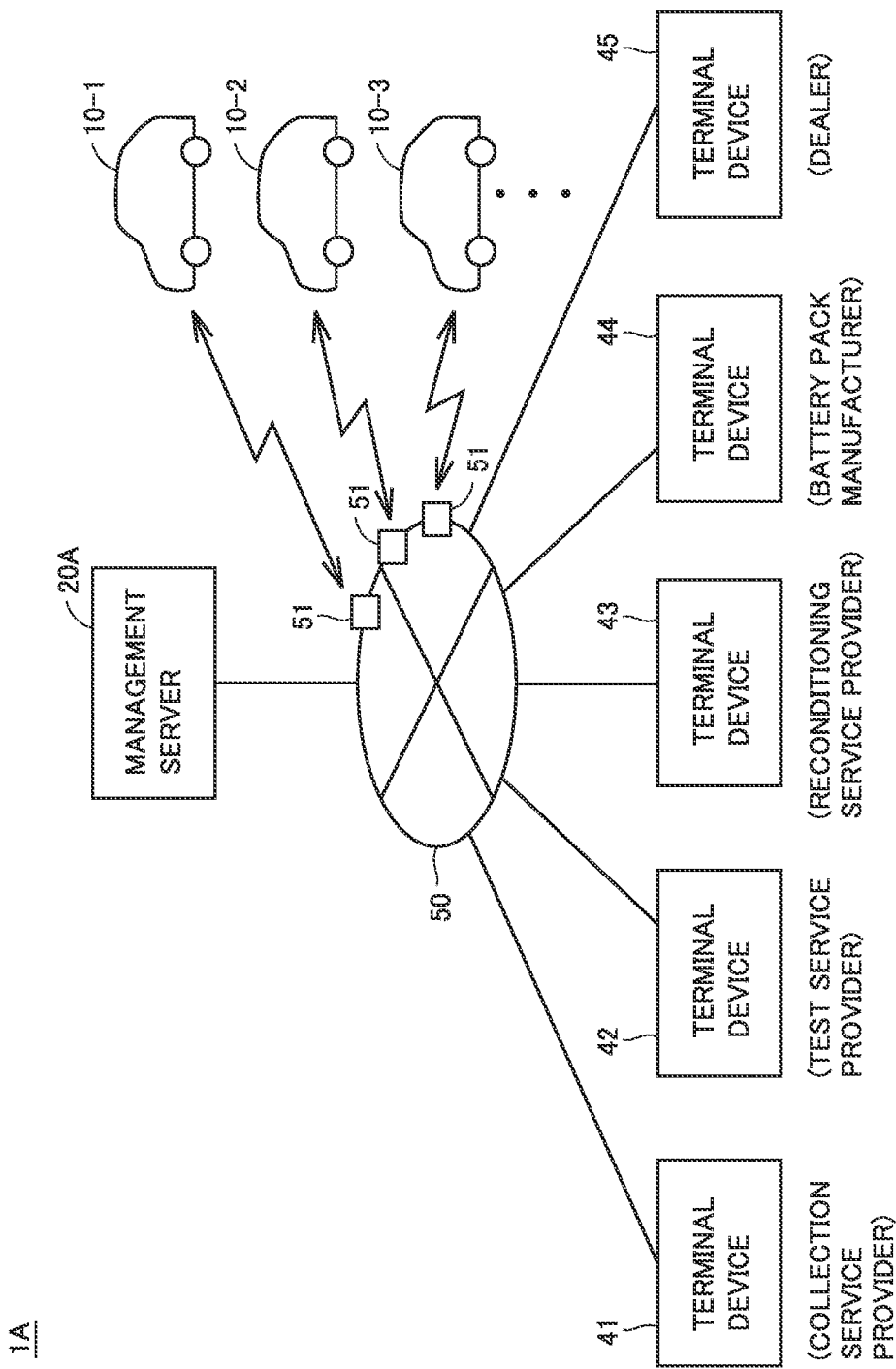
FIG. 19 is a diagram showing a configuration example of a battery management system in a second embodiment.

FIG. 19 is a diagram showing a configuration example of a battery management system in the second embodiment. Referring to FIG. 19, a battery management system 1A includes a plurality of vehicles 10-1, 10-2, . . . , a management server 20A, terminal devices 41 to 45, and communication network 50. Each of vehicles 10-1, 10-2, . . . incorporates battery packs.

Though details will be described later, one example of operations by battery management system 1A will be outlined. In battery management system 1A, information on a temperature of a battery assembly in a battery pack mounted on each of vehicles 10-1, 10-2, . . . is transmitted to management server 20A from each vehicle through communication network 50, together with information on load in running (a frequency of running or a time period of running) or an area of running of each vehicle. The transmitted information on the temperature of the battery assembly of each vehicle is accumulated in management server 20A for each load in running or each area of running. Management server 20A accumulates information on recyclable cells included in secondhand battery packs 62-1, 62-2, . . . collected to a collection site.

Specifications (a condition of use (a load) or an area of use) of a rebuilt product of a battery pack can be input through terminal device 45 of dealer 35. When the specifications of the rebuilt product are input to terminal device 45, information on the specifications of the rebuilt product is transmitted from terminal device 45 to management server 20A. Management server 20A obtains temperature information in conformity with the specifications of the rebuilt product received from terminal device 45 from temperature information of a battery assembly accumulated for each load in running or each area of running, and generates a history of use of the battery assembly from the obtained temperature information. Management server 20A generates rebuilding information for constructing a rebuilt product in conformity with the specifications input from terminal device 45 by referring to the generated history of use of the battery assembly and information on recyclable cells.

The generated rebuilding information is transmitted from management server 20A to terminal device 44 of battery pack manufacturer 34, and battery pack manufacturer 34 selects a cell based on the rebuilding information from among recyclable cells and manufactures a rebuilt product of a battery pack in conformity with the specifications.

Figure 20:
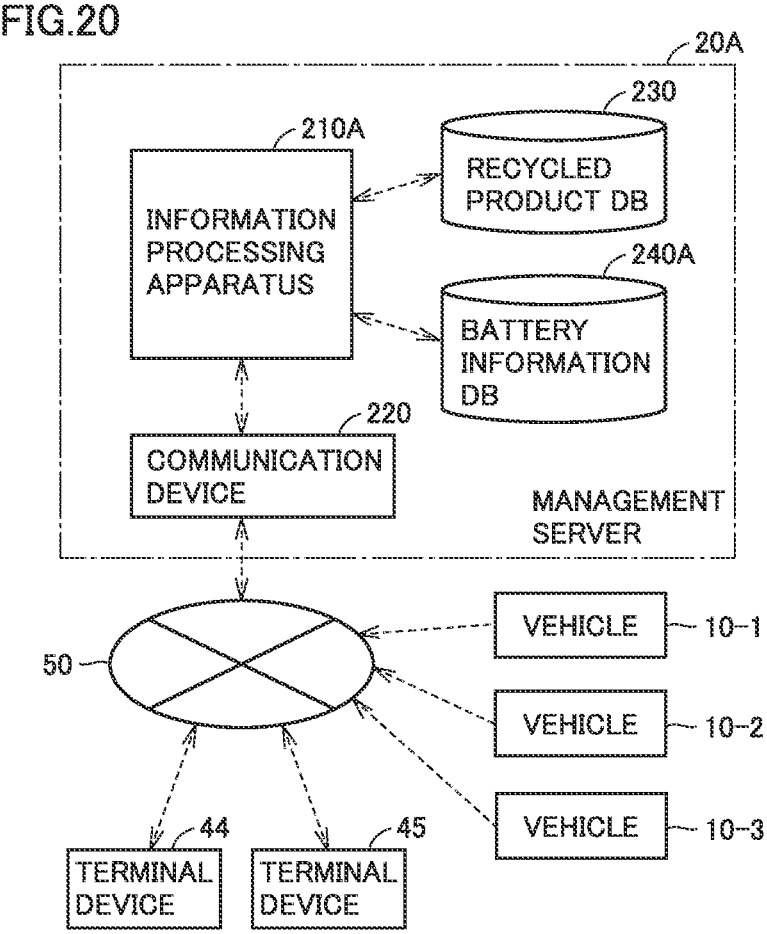
FIG. 20 is a diagram showing in detail a configuration of a management server shown in FIG. 19.

FIG. 20 is a diagram showing in detail a configuration of management server 20A shown in FIG. 19. Since each of vehicles 10-1, 10-2, . . . is basically the same in configuration as vehicle 10 shown in FIG. 4, description of a detailed configuration of each vehicle will not be repeated.

Referring to FIG. 20, management server 20A includes an information processing apparatus 210A, communication device 220, recycled product DB 230, and a battery information DB 240A. Communication device 220 of management server 20A corresponds to one embodiment of the "information obtaining device" in the present disclosure.

Battery information DB 240A accumulates information on a temperature of a battery assembly in a battery pack mounted on each vehicle, information on a load in running such as a frequency of running or a time period of running, and information on an area of running which are periodically obtained by communication device 220 through communication network 50 from each of vehicles 10-1, 10-2, . . . Battery information DB 240A accumulates temperature frequency information of a battery assembly for each load in running or each area of running generated by information processing apparatus 210A based on various types of information accumulated in battery information DB 240A.

When information processing apparatus 210A receives information on specifications of a rebuilt product of a battery pack from terminal device 45 of dealer 35 through communication device 220, it generates rebuilding information for manufacturing a rebuilt product in conformity with the specification information by using the received specification information, the temperature frequency information of the battery assembly for each load in running or each area of running stored in battery information DB 240A, and information on recyclable cells stored in recycled product DB 230. Details of specific processing for generating rebuilding information will be described later.

Information processing apparatus 210A transmits the generated rebuilding information to terminal device 44 of battery pack manufacturer 34 through communication device 220. Battery pack manufacturer 34 thus manufactures a rebuilt product in conformity with the specification information input from terminal device 45 of dealer 35 in accordance with the rebuilding information generated by management server 20A.

Figure 21:
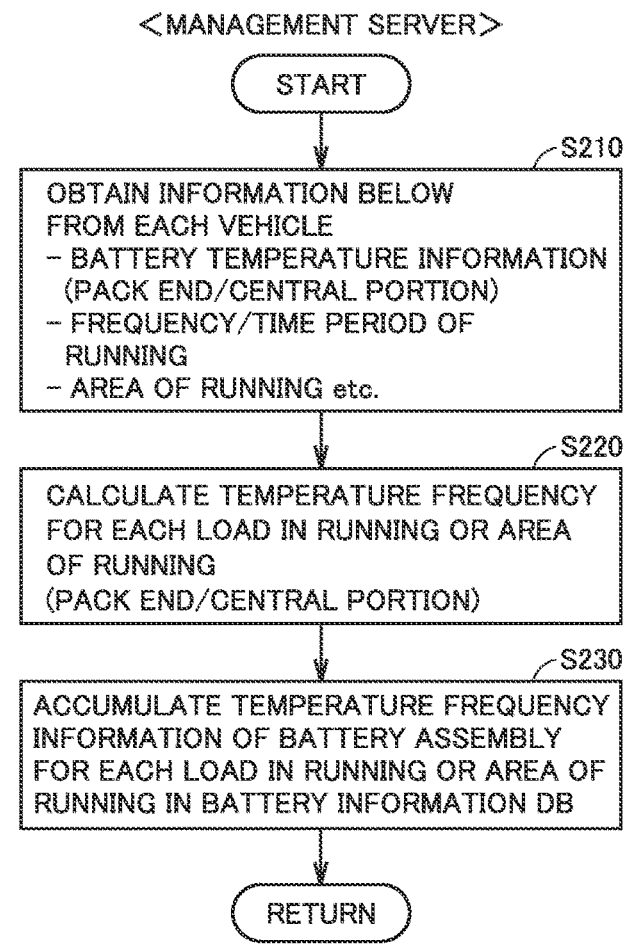
FIG. 21 is a flowchart illustrating a procedure in processing for collecting temperature information performed by the management server.

FIG. 21 is a flowchart illustrating a procedure in processing for collecting temperature information performed by management server 20A shown in FIG. 20. Processing shown in this flowchart is repeatedly performed by being called from a main routine every prescribed time or when a prescribed condition is satisfied.

Referring to FIG. 21, management server 20A obtains various types of information shown below from each of vehicles 10-1, 10-2, . . . (step S210). Management server 20A obtains information on a temperature of a battery assembly in a battery pack mounted on each vehicle from each vehicle. Specifically, as described with reference to FIG. 5, in each vehicle, a temperature of a cell arranged in the vicinity of the outer periphery of the battery assembly (pack end) and a temperature of a cell arranged in the central portion (pack central portion) of the battery assembly are detected. Then, the detected temperature is transmitted from each vehicle to management server 20A as temperature information and management server 20A receives the temperature information from each vehicle.

Management server 20A obtains information on a frequency of running or a time period of running which represent a load in running of each vehicle from each vehicle. Management server 20A further obtains also information on an area of running of each vehicle from each vehicle. For example, categorization of the area of running can serve for distinction between climates (for example, a warm area or a cold area).

Then, management server 20A calculates a temperature frequency of a temperature of a cell at the pack end and a temperature frequency of a temperature of a cell in the pack central portion for each load in running or each area of running based on the information collected from each vehicle (step S220).

Management server 20A generates temperature frequency information resulting from calculation of a frequency of each temperature, for each load in running or each area of running based on the temperature frequency calculated in step S220, and accumulates the generated temperature frequency information in battery information DB 240A (step S230). Specifically, management server 20A generates first temperature frequency information representing a frequency of each temperature of a cell at the pack end and second temperature frequency information representing a frequency of each temperature of a cell in the pack central portion for each load in running or each area of running, and outputs the temperature frequency information to battery information DB 240A.

Figure 22:
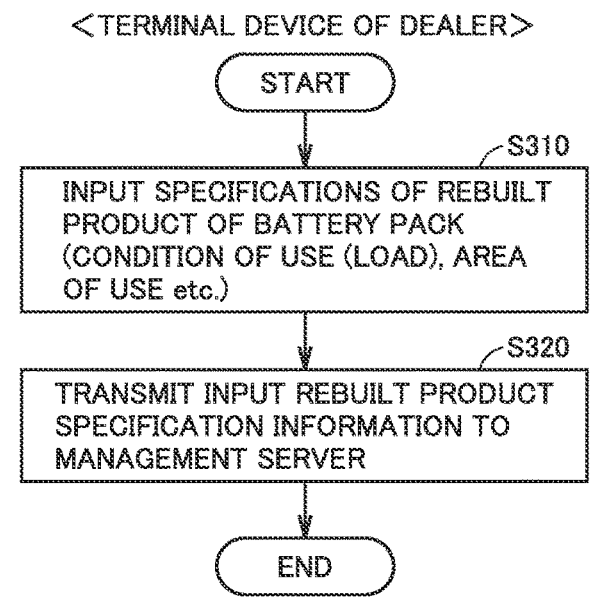
FIG. 22 is a flowchart illustrating a procedure in processing performed by the terminal device of the dealer.

FIG. 22 is a flowchart illustrating a procedure in processing performed by terminal device 45 of dealer 35. Referring to FIG. 22, terminal device 45 of dealer 35 accepts input of specifications of a rebuilt product of a battery pack (step S310). The specifications of the rebuilt product include, for example, information on a condition of use (a load) or an area of use of the battery assembly. Terminal device 45 transmits the input specification information representing the specifications of the rebuilt product to management server 20A through communication network 50 (step S320).

FIG. 23 is a flowchart illustrating a procedure in processing for generating rebuilding information performed by management server 20A. Processing shown in the flowchart is performed when information on specifications of a rebuilt product of a battery pack is received from terminal device 45 of dealer 35.

Referring to FIG. 23, management server 20A (information processing apparatus 210A) receives information on specifications of a rebuilt product from terminal device 45 (step S410). Management server 20A obtains temperature frequency information (first and second temperature frequency information) of a battery assembly in conformity with the received specification information from battery information DB 240A (FIG. 20) (step S420). Management server 20A obtains from battery information DB 240A, temperature frequency information of the battery assembly in connection with a load in running or an area of running in conformity with a condition of use (a load) or an area of use of the battery assembly included in the specification information received from terminal device 45.

Management server 20A then generates a temperature frequency distribution of the battery assembly based on the temperature frequency information of the battery assembly obtained from battery information DB 240A (step S430). Specifically, management server 20A generates a temperature frequency distribution of a cell at the pack end based on first temperature frequency information representing a frequency of each temperature of the cell at the pack end and generates a temperature frequency distribution of a cell in the pack central portion based on second temperature frequency information representing a frequency of each temperature of the cell in the pack central portion.

Management server 20A generates a history of use of the battery assembly based on the generated temperature frequency distribution (step S440). Specifically, as in the first embodiment, management server 20A generates information on temperature Tedge representing a temperature at a frequency peak in the temperature frequency distribution of the cell at the pack end, temperature Tcen representing a temperature at a frequency peak in the temperature frequency distribution of the cell in the pack central portion, relation in terms of temperature level between temperature Tedge and temperature Tcen, temperature difference ΔT1 between temperature Tedge and temperature Tcen when the condition of Tedge>Tcen is satisfied, and temperature difference ΔT2 between temperature Tcen and temperature Tedge when the condition of Tedge<Tcen is satisfied.

When the history of use of the battery assembly is generated in step S440, the process proceeds to step S450. Processing in steps S450 to S490 is the same as processing in steps S150 to S190 described with reference to FIG. 5 in the first embodiment and description of the processing will not be repeated.

According to the second embodiment as set forth above, a rebuilt product, for example, in accordance with an area of use by a user (a warm area/a cold area) or a load imposed by use (a frequency of running or a time period of running) can be manufactured by using information on temperatures of battery assemblies in a plurality of vehicles collected by management server 20A (big data).

Though management servers 20 and 20A generate rebuilding information for rebuilding battery pack 10 in the first and second embodiments, a terminal device different from management servers 20 and 20A may obtain a history of use of a battery assembly of vehicle 10 generated in management servers 20 and 20A from management servers 20 and 20A and generate rebuilding information. Such a terminal device may be any of terminal devices 41 to 45 shown in FIG. 1 or may separately be provided.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A method of manufacturing a battery assembly including a plurality of cells, the method comprising:
    obtaining replacement information for manufacturing the battery assembly by replacing at least some of the plurality of cells with replacement cells; and
    manufacturing the battery assembly by using replacement cells selected in accordance with the obtained replacement information,
    the replacement information being information generated by using a first temperature history and a second temperature history, the first temperature history representing a temperature history of a cell arranged in vicinity of an outer periphery of the battery assembly, the second temperature history representing a temperature history of a cell arranged in a central portion of the battery assembly, and
    the replacement information
        indicating that a first replacement cell is to be selected and arranged in the vicinity of the outer periphery of the battery assembly when a first temperature indicating an index of the first temperature history is higher than a second temperature indicating an index of the second temperature history, the first replacement cell being determined as being less likely to deteriorate than a cell arranged in the central portion of the battery assembly based on a prescribed indicator indicating less likeliness of deterioration of a cell, and
        indicating that a second replacement cell is to be selected and arranged in the central portion of the battery assembly when the second temperature is higher than the first temperature, the second replacement cell being determined as being less likely to deteriorate than a cell arranged in the vicinity of the outer periphery of the battery assembly based on the indicator.

\* \* \* \* \*